(12) United States Patent
Yahagi et al.

(10) Patent No.: US 8,749,660 B2
(45) Date of Patent: Jun. 10, 2014

(54) IMAGE RECORDING APPARATUS AND IMAGE PROCESSING METHOD

(75) Inventors: Koichi Yahagi, Saitama (JP); Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 68 days.

(21) Appl. No.: 13/636,601

(22) PCT Filed: Nov. 24, 2010

(86) PCT No.: PCT/JP2010/070849
§ 371 (c)(1),
(2), (4) Date: Sep. 21, 2012

(87) PCT Pub. No.: WO2011/118084
PCT Pub. Date: Sep. 29, 2011

(65) Prior Publication Data
US 2013/0016256 A1 Jan. 17, 2013

(30) Foreign Application Priority Data
Mar. 24, 2010 (JP) ................................. 2010-068237

(51) Int. Cl.
*H04N 5/228* (2006.01)

(52) U.S. Cl.
USPC .............. 348/222.1; 348/42; 348/46; 348/47; 348/48; 348/207.99

(58) Field of Classification Search
None
See application file for complete search history.

(56) References Cited

U.S. PATENT DOCUMENTS

| 2001/0052935 | A1 | 12/2001 | Yano | |
| 2008/0158369 | A1 | 7/2008 | Watanabe | |
| 2010/0002073 | A1* | 1/2010 | Robinson et al. | 348/42 |
| 2010/0289877 | A1* | 11/2010 | Lanfranchi et al. | 348/46 |

FOREIGN PATENT DOCUMENTS

| JP | 61-144192 A | 7/1986 |
| JP | 1-279696 A | 11/1989 |
| JP | 2001-346226 A | 12/2001 |
| JP | 2005-229560 A | 8/2005 |
| JP | 2007-110360 A | 4/2007 |
| JP | 2008-167064 A | 7/2008 |

OTHER PUBLICATIONS

International Search Report issued in PCT/JP2010/070849 mailed Feb. 22, 2011.
Written Opinion of the International Searching Authority issued in PCT/JP2010/070849 mailed Feb. 22, 2011.

* cited by examiner

*Primary Examiner* — Yogesh Aggarwal
(74) *Attorney, Agent, or Firm* — Birch, Stewart, Kolasch & Birch, LLP

(57) ABSTRACT

An image processing apparatus having: an image acquisition unit that acquires a plurality of viewpoint images; a disparity map generation unit that generates a disparity map representing a disparity distribution; a multi-viewpoint image generation unit that generates a multi-viewpoint image including a plurality of viewpoint images the number of which is larger than the number of the plurality of viewpoint images based on the plurality of viewpoint images and the disparity map; an image processing unit that performs image processing for a subject image of the multi-viewpoint image based on the multi-viewpoint image and the disparity map and switches an amount of image processing for the subject image depending on the disparity; and an output unit that switches the plurality of viewpoint images included in the multi-viewpoint image, which has been subjected to image processing by the image processing unit, and sequentially outputs the viewpoint images.

16 Claims, 8 Drawing Sheets

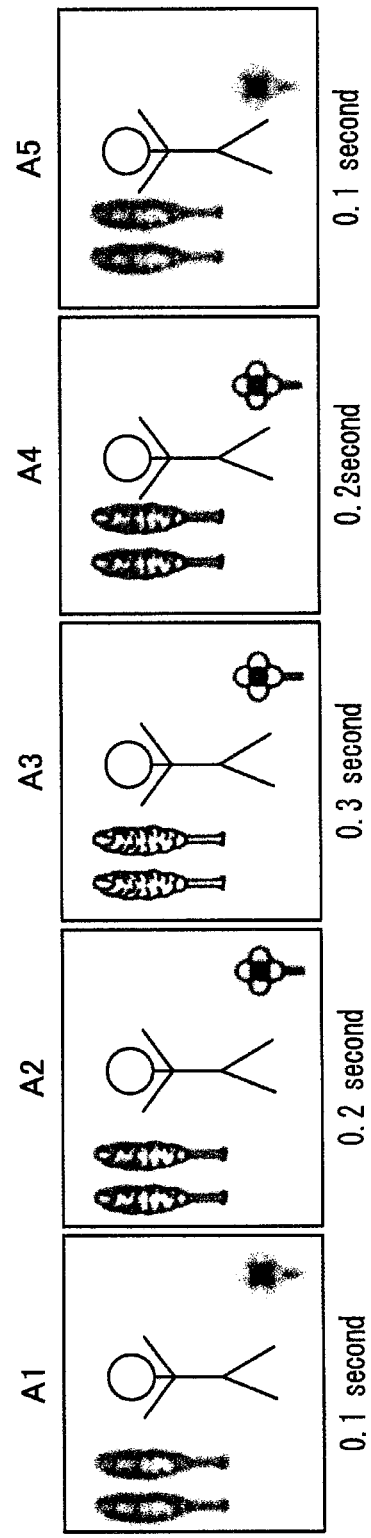

IMAGE RECORDING APPARATUS AND IMAGE PROCESSING METHOD

TECHNICAL FIELD

The present invention relates to an image processing apparatus and an image processing method enabling a multi-viewpoint image to be easily confirmed by two-dimensional display.

BACKGROUND ART

A 3D (three-dimensional) digital camera (stereoscopic imaging apparatus) for imaging a subject at a plurality of viewpoints and a 3D photographic printer (stereoscopic image printing apparatus) for generating a 3D photographic print have been provided.

For example, a subject is imaged at right and left viewpoints by the 3D digital camera to acquire a stereo image (a left viewpoint image and a right viewpoint image), a depth map is generated based on the stereo image, an intermediate viewpoint image is generated based on the stereo image and the depth map, and a multi-viewpoint image obtained by adding the intermediate viewpoint image to the stereo image is printed on an lenticular sheet (see Patent Document 1).

Patent Document 2 discusses a configuration in which a left viewpoint image and a right viewpoint image are alternately displayed while being cross-faded.

CITATION LIST

Patent Literature

PTL 1: Japanese Patent Application Laid-Open No. 2001-346226
PTL 2: Japanese Patent Application Laid-Open No. 2005-229560

SUMMARY OF INVENTION

Technical Problem

There is a request to previously confirm on a normal display device whether there is no problem in a stereoscopic feeling, an image quality, and a distortion when printing has been performed before a 3D photographic print is generated from a multi-viewpoint image. However, it is difficult to previously confirm the 3D photographic print, as long as a specific display device capable of 3D display at a similar fine pitch to that in the 3D photographic print is not used. Even if a specific display device capable of 3D display is manufactured in a similar method to that for the 3D photographic print, previous confirmation cannot be performed in an environment in which there is no specific display device (e.g., at a user's home). More specifically, an attempt to reproduce a seeing method of the 3D photographic print requires an extensive facility and time.

The present invention has been made in view of such a situation, and is directed to providing an image processing apparatus and an image processing method for easily confirming a multi-viewpoint image.

Solution to Problems

To attain the above-mentioned object, the present invention provides an image processing apparatus characterized by comprising an image acquisition unit that acquires a plurality of viewpoint images generated by imaging a subject at a plurality of viewpoints, a disparity map generation unit that generates a disparity map representing a disparity distribution based on the plurality of viewpoint images, a multi-viewpoint image generation unit that generates a multi-viewpoint image including a plurality of viewpoint images the number of which is larger than the number of the plurality of viewpoint images based on the plurality of viewpoint images and the disparity map, an image processing unit that performs image processing for a subject image of the multi-viewpoint image based on the multi-viewpoint image and the disparity map and switches an amount of image processing for the subject image depending on the disparity, and an output unit that switches the plurality of viewpoint images included in the multi-viewpoint image, which has been subjected to image processing by the image processing unit, and sequentially outputs the viewpoint images.

More specifically, the amount of image processing for the subject image is switched depending on the disparity for the multi-viewpoint image to perform image processing, and the plurality of viewpoint images included in the multi-viewpoint image are switched in the order of their viewpoints and sequentially output. Therefore, the plurality of viewpoint images can be output to a normal display device without using a specific display device so that the multi-viewpoint image can be previously confirmed by a planar image. More specifically, the multi-viewpoint image can be easily confirmed.

In one aspect of the present invention, the image processing apparatus is characterized by further comprising a display control unit that switches the plurality of viewpoint images included in the multi-viewpoint image, which has been subjected to image processing by the image processing unit, in the order of their viewpoints and displays viewpoint images in two dimensions on a display device serving as the output unit.

In one aspect of the present invention, the image processing apparatus is characterized by further comprising a moving image file generation unit that generates a moving image file for switching the plurality of viewpoint images included in the multi-viewpoint image, which has been subjected to image processing by the image processing unit, in the order of their viewpoints and displaying viewpoint images in two dimensions on the display device serving as the output unit.

In one aspect of the present invention, the image processing apparatus is characterized in that the image processing unit makes an amount of blur of pixels, between which there is a larger disparity, in the multi-viewpoint image larger.

In one aspect of the present invention, the image processing apparatus is characterized in that the image processing unit makes amounts of blur of the viewpoint images at viewpoint positions at both ends out of the plurality of viewpoint images included in the multi-viewpoint image larger than an amount of blur of the viewpoint image at a viewpoint position at the center.

In one aspect of the present invention, the image processing apparatus is characterized in that the image processing unit makes an amount of decrease in at least one of saturation, contrast, and sharpness of pixels, between which there is a larger disparity, composing the multi-viewpoint image larger.

In one aspect of the present invention, the image processing apparatus is characterized in that the image processing unit makes the amounts of decrease of the viewpoint images at the viewpoint positions at both ends out of the plurality of viewpoint images included in the multi-viewpoint image larger than the amount of decrease of the viewpoint image at the viewpoint position at the center.

In one aspect of the present invention, the image processing apparatus is characterized in that the image processing unit refers to the disparity map, uses pixels between which there is no disparity as a reference, to determine whether a subject image within each of the viewpoint images is a back-side area or a front-side area, and performs image processing for reducing the subject image in the back-side area and enlarging the subject image in the front-side area.

In one aspect of the present invention, the image processing apparatus is characterized in that the output unit makes output times of the viewpoint images at viewpoint positions at both ends out of the plurality of viewpoint images included in the multi-viewpoint image shorter than an output time of the viewpoint image at the viewpoint position at the center.

The present invention provides an image processing method characterized by comprising an image acquisition step for acquiring a plurality of viewpoint images generated by imaging a subject at a plurality of viewpoints, a disparity map generation step for generating a disparity map representing a disparity distribution based on the plurality of viewpoint images, a multi-viewpoint image generation step for generating a multi-viewpoint image including a plurality of viewpoint images the number of which is larger than the number of the plurality of viewpoint images based on the plurality of viewpoint images and the disparity map, an image processing step for performing image processing for a subject image of the multi-viewpoint image based on the multi-viewpoint image and the disparity map and switching an amount of image processing for the subject image depending on the disparity, and an output step for switching the plurality of viewpoint images included in the multi-viewpoint image, which has been subjected to image processing in the image processing step, in the order of their viewpoints and sequentially outputting the viewpoint images.

In one aspect of the present invention, the image processing method is characterized by comprising a moving image file generation step for generating a moving image file for switching the plurality of viewpoint images included in the multi-viewpoint image, which has been subjected to image processing in the image processing step, in the order of their viewpoints and displaying the viewpoint images in two dimensions on a display device.

Advantageous Effects of Invention

According to the present invention, a multi-viewpoint image can be easily confirmed.

BRIEF DESCRIPTION OF DRAWINGS

FIG. 8 is an illustration used for describing image processing in a third embodiment.

DESCRIPTION OF EMBODIMENTS

Embodiments of the present invention will be described in detail below with reference to the accompanying drawings.

Figure 1:
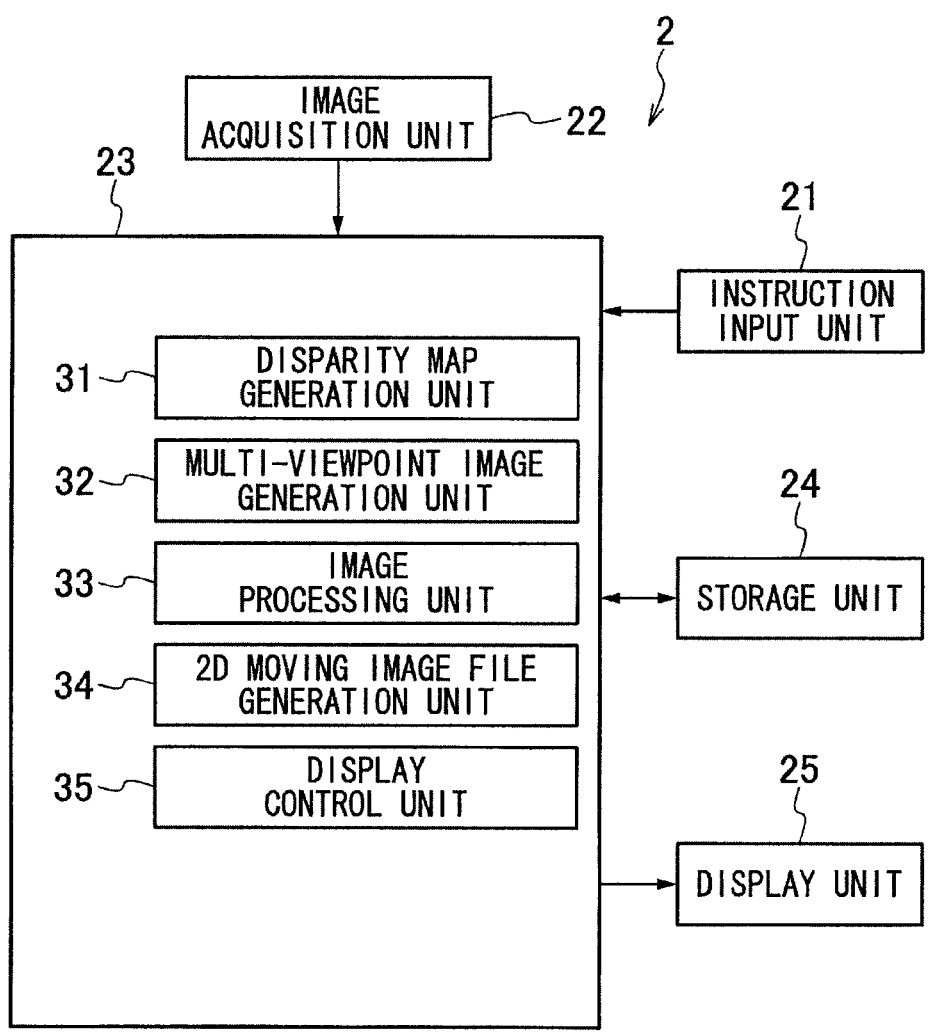
FIG. 1 is an overall configuration diagram of an example of an image processing apparatus.

FIG. 1 is a block diagram illustrating the whole configuration of an example of an image processing apparatus according to the present invention.

In FIG. 1, an image processing apparatus 2 includes an instruction input unit 21, an image acquisition unit 22, a CPU 23, a storage unit 24, and a display unit 25. The CPU 23 includes a disparity map generation unit 31, a multi-viewpoint image generation unit 32, an image processing unit 33, a 2D moving image file generation unit 34, and a display control unit 35.

The instruction input unit 21 is an input device for inputting an instruction. The instruction input unit 21 includes a keyboard and a pointing device, for example. The instruction input unit 21 may be a touch sensor.

The image acquisition unit 22 is an input device used to input image data (hereinafter merely referred to as an "image"). The image acquisition unit 22 includes a recording media interface for inputting/outputting data to/from removable recording media such as a memory card and a network interface for inputting/outputting data to/from a network.

The image acquisition unit 22 in this example inputs a stereoscopic image including two viewpoint images (a left viewpoint image and a right viewpoint image) (hereinafter referred to as a "two-viewpoint image") respectively generated by imaging a subject at a right viewpoint and a left viewpoint.

The CPU (Central Processing Unit) 23 controls each of the units in the image processing apparatus 2 while performing various types of image processing.

The storage unit 24 is a storage device storing various types of data, and includes a nonvolatile memory or a disk.

The display unit 25 is a display device such as a liquid crystal display device. In the present embodiment, the display unit 25 may be displaceable in two dimensions, and need not be displaceable in three dimensions (stereoscopically).

The disparity map generation unit 31 generates a disparity map based on the two-viewpoint image acquired by the image acquisition unit 22.

The disparity map is information representing a disparity distribution of the two-viewpoint image. In this example, a difference in coordinates between pixels in the left viewpoint image and pixels in the right viewpoint image, between which there is a correspondence relationship, is used as a disparity. Such a disparity will be described in detail below.

The disparity is information corresponding to the depth of a subject. Therefore, the disparity may also be called "depth information" or "distance information". A depth amount may be used as the disparity.

The multi-viewpoint image generation unit 32 generates a multi-viewpoint image including a plurality of viewpoint images, which is larger in number than the two-viewpoint image (the right viewpoint image and the left viewpoint image) based on the two-viewpoint image and the disparity map. More specifically, the multi-viewpoint image is generated as image data for a 3D photographic print having viewpoints, the number of which is made larger than that of the two-viewpoint image. In this example, a viewpoint image at an intermediate viewpoint (hereinafter referred to as an "intermediate viewpoint image") is generated based on the two-viewpoint image and the disparity map, i.e., an intermediate viewpoint image having one or more viewpoints is added to the two-viewpoint image, to generate a multi-viewpoint image including viewpoint images at three or more viewpoints. The present invention is also applicable to a case where a multi-viewpoint image not including the original two-viewpoint image is generated.

The image processing unit 33 performs image processing for the multi-viewpoint image based on the multi-viewpoint image and the disparity map to enable the display unit 25 to confirm a stereoscopic feeling of the multi-viewpoint image, for example, in 2D display of a 2D moving image file, described below. Specific examples of such image processing include blurring processing, decrease in contrast, decrease in saturation, decrease in sharpness, and enlargement/reduction (scaling). The specific examples will be described in detail below.

The 2D moving image file generation unit 34 generates a 2D moving image file for switching a plurality of viewpoint images included in the multi-viewpoint image, which has been subjected to image processing, in the order of their viewpoints to display the viewpoint images in two dimensions on the display unit 25.

The display control unit 35 switches a plurality of viewpoint images included in the multi-viewpoint image in the order of their viewpoints to display the viewpoint images in two dimensions on the display unit 25 according to the 2D moving image file.

An amount of disparity will be described below with reference to FIG. 2.

Figure 2:
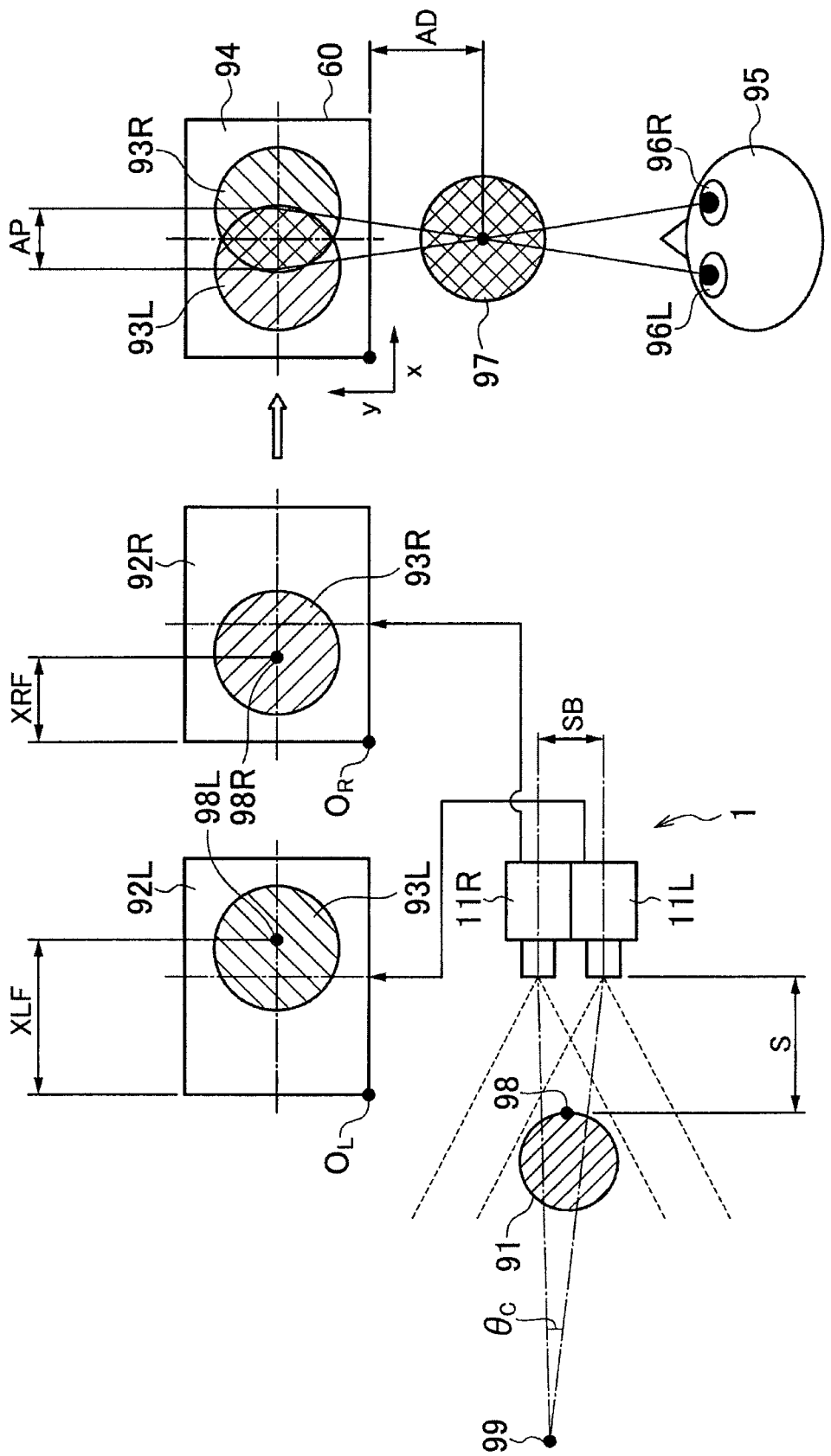
FIG. 2 is an illustration used for describing a disparity.

In FIG. 2, a 3D digital camera 1 includes a plurality of imaging systems 11L and 11R capable of generating a two-viewpoint image. Each of the imaging systems 11L and 11R includes a photographic optical system including a zoom lens, a focus lens, and a diaphragm, and an image sensor (e.g., a CCD (Charge Coupled Device) image sensor or a CMOS (Complementary Metal-Oxide Semiconductor) image sensor). To facilitate understanding of the invention, description is made as a base length SB (a spacing between optical axes of the imaging systems 11L and 11R) and a convergence angle θc (an angle formed between the optical axes of the imaging systems 11L and 11R) being fixed in the 3D digital camera 1.

The plurality of imaging systems 11L and 11R respectively image the same subject 91 (a spherical body in this example) at a plurality of viewpoints, to generate a two-viewpoint image (a left viewpoint image 92L and a right viewpoint image 92R). The generated two-viewpoint image 92L and 92R respectively include subject images 93L and 93R on which the same subject 91 has been projected. A 3D motor 60 overlaps and displays the two viewpoint images 92L and 92R so that a stereoscopic image 94 is displayed in three dimensions (stereoscopically displayed).

Figure 3:
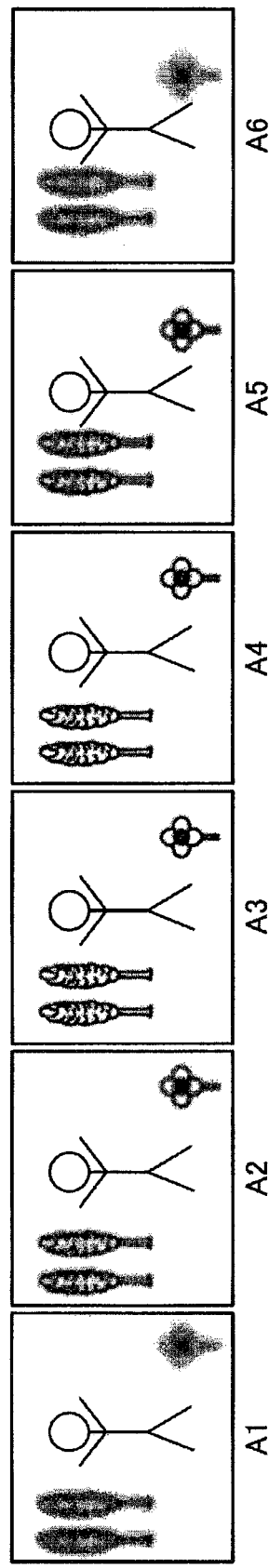
FIG. 3 illustrates an example of a multi-viewpoint image.
Figure 4:
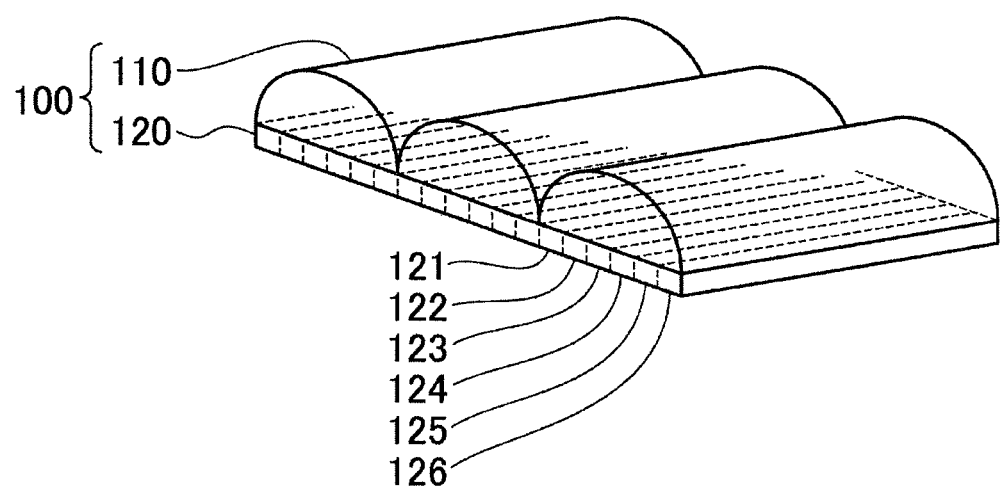
FIG. 4 is a perspective view schematically illustrating a lenticular sheet.

If a 3D photographic print is made, a multi-viewpoint image (a set of viewpoint images A1 to A6), as illustrated in FIG. 3, is first generated from the two-viewpoint image. The multi-viewpoint image has a total of six viewpoints. The viewpoint image A1 at the leftmost viewpoint position corresponds to the left viewpoint image 92L generated by the left imaging system 11L in the 3D digital camera 1 illustrated in FIG. 2, the viewpoint image A6 at the rightmost viewpoint position corresponds to the right viewpoint image 92R generated by the right imaging system 11R in the 3D digital camera 1 illustrated in FIG. 2, and the viewpoint images A2 to A5 at intermediate viewpoint positions are images (intermediate viewpoint images) generated based on the disparity map from the two viewpoint image A1 and A6. The multiple viewpoint images A1 to A6 are then printed on a lenticular sheet 100 as illustrated in FIG. 4, for example. A translucent lenticular lens 110 in a barrel-vaulted shape is formed on one surface of the lenticular sheet 100 illustrated in FIG. 4, and a receptive layer 120 that receives ink is formed on the other surface. The multiple viewpoint images A1 to A6 are respectively printed with ink on strip-shaped areas 121 to 126 of the receptive layer 120.

An observer observes the multi-viewpoint image printed on the side of the receptive layer 120 in the lenticular sheet 100 with both his/her eyes from the side of the lenticular lens 110 so that a subject image can be stereoscopically viewed, like in a case illustrated in FIG. 2 (i.e., a case where an observer 95 observes the stereoscopic image 94 on the 3D monitor 60).

When the observer 95 observes the stereoscopic image 94 with both his/her eyes 96L and 96R in FIG. 2, a virtual image 97 of the subject seems projected. In FIG. 2, the subject 91 exists at a position closer than a convergence point 99 (a cross point) between the optical axes so that the virtual image 97 seems projected forward. If the subject exists at a position farther than the convergence point 99, however, the virtual image seems retracted backward.

Within a range in which a subject distance S is smaller than a distance to the convergence point 99 in FIG. 2, the smaller the subject distance S is, the larger a difference |XLF-XRF| between center coordinates XLF and XRF of the subject images 92L and 92R becomes. More specifically, the smaller the subject distance S is, the farther corresponding pixels are spaced apart from each other between the viewpoint images 92L and 92R. The difference |XLF-XRF| is only an x-coordinate, which is represented as AP. More specifically, if the base length SB and the convergence angle θc are determined, the smaller the subject distance S is, the larger AP becomes, and the larger an amount of projection AD of the virtual image 97 experienced by the observer 95 also becomes before the convergence point 99.

Depth information of pixels in each viewpoint image can be represented using AP illustrated in FIG. 2 if a base length SB, a convergence angle θc, and a focal length are determined. If the subject 91 exists ahead of the convergence point 99, for example, a value obtained by affixing a positive sign to AP becomes depth information (a disparity). If the subject 91 exists behind the convergence point 99, a value obtained by affixing a negative sign to AP becomes depth information (a disparity). Depth information corresponding to the convergence point 99 is zero. In this case, if the depth information is positive, the larger its value is, the larger the amount of projection AD becomes. If the depth information is negative, the larger its absolute value is, the larger an amount of retraction becomes. The depth information also corresponds to the subject distance S, and thus can be represented using the subject distance S.

While a case where the base length SB and the convergence angle θc are constant has been described as an example, the amount of projection AD changes depending on the convergence angle θc and the subject distance S in the case of a structure in which the convergence angle θc is variable. In the case of a structure in which the convergence angle θc as well as the base length SB is also variable, the amount of projection AD changes depending on the base length SB, the convergence angle θc, and the subject distance S. Even if the base length SB and the convergence angle θc are constant, the amount of projection AD changes when pixels are shifted between the two viewpoint images 92L and 92R to change the amount of disparity AP.

FIGS. 2 to 4 are not particularly limited to such a case because one example is introduced to understand the present invention. The present invention is also applicable to a case where the 3D digital camera 1 illustrated in FIG. 2 is not used, e.g., a case where a plurality of digital cameras are used to stereoscopically image a subject and a case where a single photographic optical system is used to stereoscopically image a subject by pupil division. The 3D photographic print is not particularly limited to a case where printing is performed on a lenticular sheet.

The present invention will be divided into various embodiments to describe the present invention below.

<First Embodiment>

A first embodiment will be first described.

The image processing unit 33 according to the present embodiment switches an amount of image processing for a subject image of a multi-viewpoint image (e.g., an amount of blur, an amount of decrease in contrast, an amount of decrease in saturation, and an amount of decrease in sharpness) to be large or small depending on whether a disparity is large or small to enable confirmation of the multi-viewpoint image by 2D moving image display.

Figure 5:
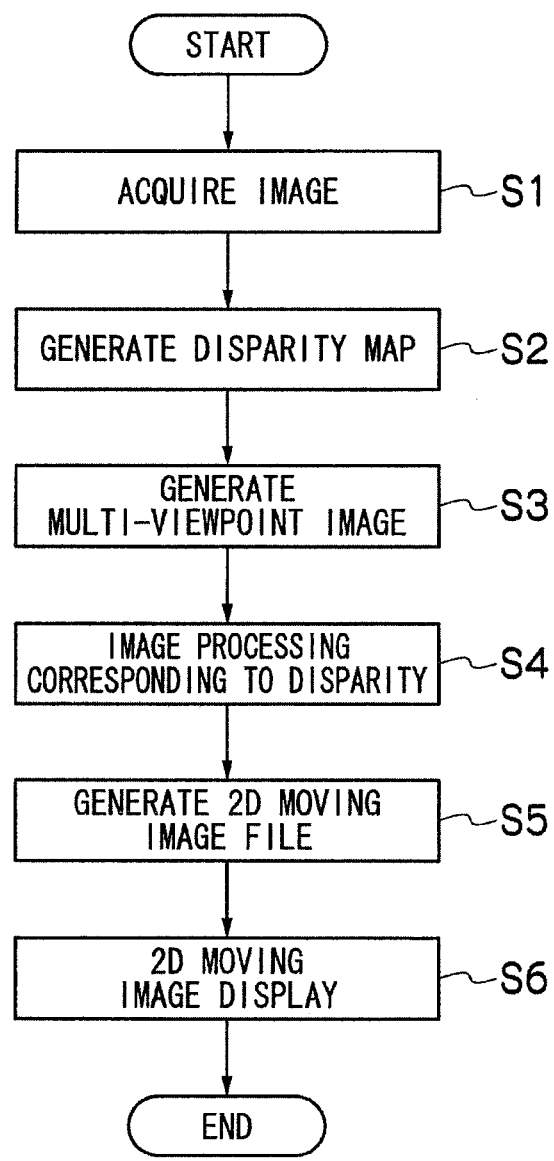
FIG. 5 is a flowchart illustrating the flow in an example of image processing.

FIG. 5 is a flowchart illustrating the flow as an example of image processing in the image processing apparatus 2 illustrated in FIG. 1.

Figure 6:
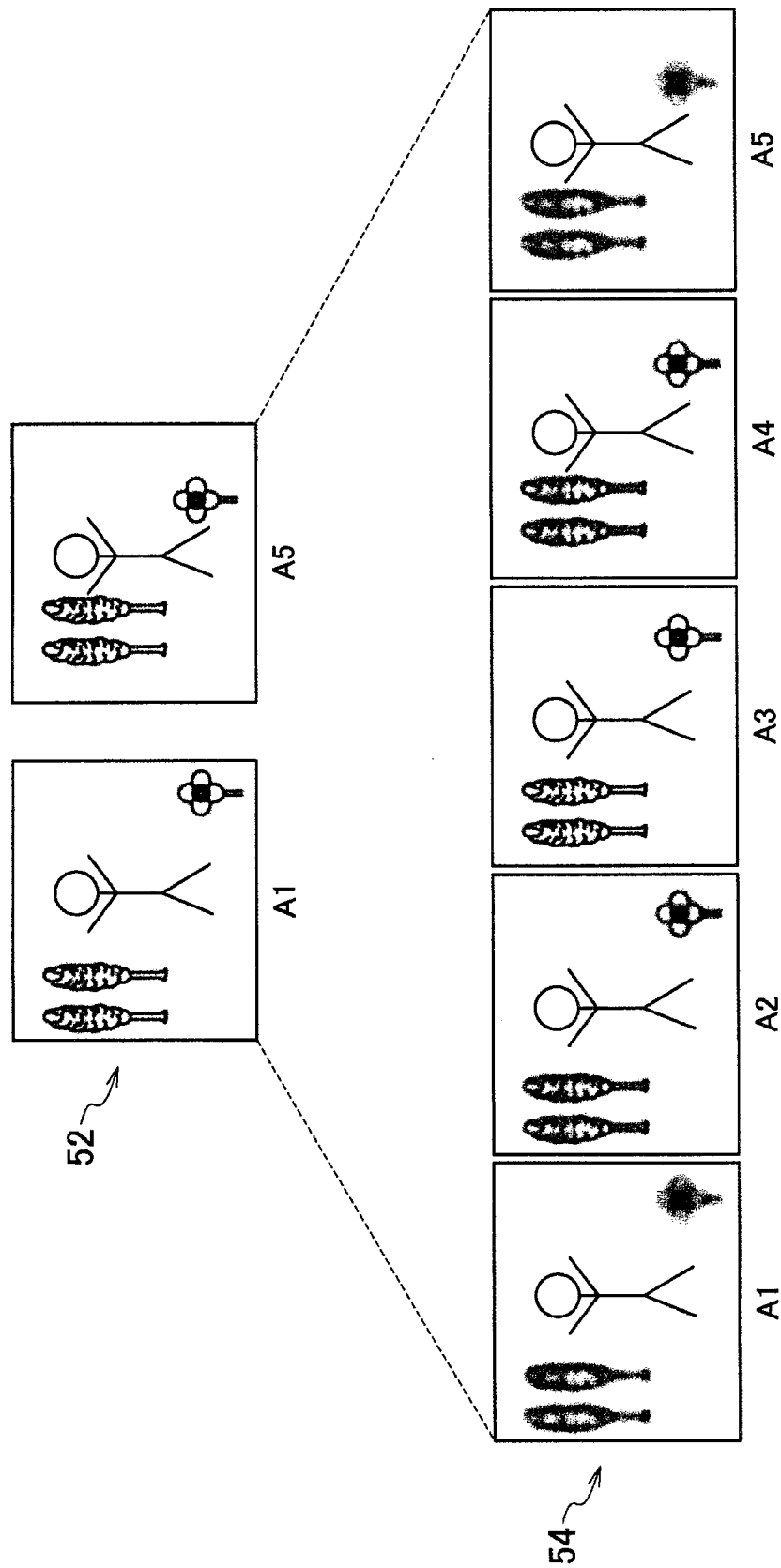
FIG. 6 is an illustration used for describing image processing in a first embodiment.

In step S1, the image acquisition unit 22 acquires a two-viewpoint image 52 illustrated in FIG. 6. The two-viewpoint image 52 includes a left viewpoint image A1 and a right viewpoint image A5 generated by imaging a subject at right and left two viewpoints.

In step S2, the disparity map generation unit 31 detects a correspondence relationship between pixels composing the right viewpoint image A5 and pixels composing the left viewpoint image A1 (detects a correspondence point) to calculate a disparity between the corresponding pixels, to generate a disparity map representing a disparity distribution in both the viewpoint images A1 and A5 (a correspondence relationship between the disparity and the pixels). The disparity is represented by a difference between coordinates of the pixel in the left viewpoint image A1 and coordinates of the pixel in the right viewpoint image A5. The disparity map in this example is represented by a disparity arrangement with a sign, and indicates that the subject is positioned ahead of a cross point (convergence point) if the sign is positive and indicates that the subject is positioned behind the cross point if the sign is negative. As to an occlusion area where a correspondence relationship cannot be detected between the respective pixels in both the viewpoint images A1 and A5, a disparity is preferably interpolated based on a disparity between pixels around the area.

In step S3, the multi-viewpoint image generation unit 32 generates intermediate viewpoint images A2, A3, and A4 based on the two-viewpoint image 52 (A1 and A5) and the disparity map, and adds the intermediate viewpoint images to the two-viewpoint image 52, to generate a multi-viewpoint image 54 (A1 to A5).

In step S4, the image processing unit 33 subjects the multi-viewpoint image 54 to image processing to change the subject image based on the multi-viewpoint image 54 and the disparity map. In this example, processing for blurring pixels between which a disparity on the disparity map (an amount of shift between pixels in the left viewpoint image A1 and the right viewpoint image A5) is large more greatly is performed for each of the viewpoint images A1, A2, A3, A4, and A5. Pixels between which there is a small disparity are hardly blurred. Pixels between which there is no disparity (pixels corresponding to the cross point) are not blurred.

As illustrated in FIG. 6, the blurring processing is not performed for an image of a person corresponding to the cross point, and an amount of blur is switched to be large or small depending on whether the disparity is large or small for an image of a flower at a short distance and an image of a tree at a long distance.

The image processing unit 33 makes the amounts of blur of the viewpoint images A1 and A5 at viewpoint positions at both ends out of the plurality of viewpoint images A1 to A5 included in the multi-viewpoint image 54 larger than the amount of blur of the viewpoint image A3 at a viewpoint position at the center. More specifically, the farther the viewpoint image is spaced apart from the viewpoint at the center, the larger the amount of blur thereof is made.

A case where the multi-viewpoint image 54 includes an odd number of viewpoint images has been described as an example to facilitate understanding of the invention, the same is true for a case where the multi-viewpoint image 54 includes an even number of viewpoint images. More specifically, the amounts of blur of the viewpoint images at the viewpoint positions at both ends are made larger than that of the viewpoint image at the viewpoint position at the center.

The blurring processing is not particularly limited as long as it uses known methods such as Gaussian, Moving Average, and Low Pass Filter.

In step S6, the 2D moving image file generation unit 34 generates a 2D moving image file for switching the viewpoint images A1 to A5 in the order of their viewpoints and displaying the viewpoint images in two dimensions on the display unit 25.

A file format of the 2D moving image file is not particularly limited as long as it is edited so that the viewpoint images A1 to A5 are displayed in this order. The 2D moving image file may be generated according to a display time (e.g., switching between 0.1 seconds and 0.5 seconds) set from the instruction input unit 21 and a display switching method (the presence or absence of fade-in/fade-out).

In step S7, the display control unit 35 switches the plurality of viewpoint images A1 to A6 included in the multi-viewpoint image 54 in the order of their viewpoints and displays the viewpoint images in two dimensions on the display unit 25 according to the 2D moving image file. For example, the viewpoint images A1, A2, A3, A4, and A5 are displayed in this forward order, and the viewpoint images A5, A4, A3, A2, and A1 are then displayed in this backward order. Display in the forward order and display in the backward order are repeated until a display stop operation is performed.

While the blurring processing has been described as an example of image processing for confirming the multi-viewpoint image by 2D moving image display, image processing such as contrast change, saturation change, and sharpness change may be performed. For example, the larger a disparity between pixels is, the larger an amount of decrease in contrast, saturation, or sharpness of the pixels is made. More specifically, image processing for making an amount of decrease in visibility of pixels between which there is a larger disparity larger is performed. Amounts of decrease of the viewpoint images at the viewpoint positions at both ends are made larger than that of the viewpoint image at the viewpoint position at the center.

As illustrated in FIG. 6, image processing, using pixels composing a subject (a person in this example) between which there is no disparity as a reference, for making an amount of blur, an amount of decrease in contrast, an amount of decrease in saturation, or an amount of decrease in sharpness of pixels composing a subject (a flower in this example) in an area ahead of the reference larger than that of pixels composing a subject (a tree in this example) in an area behind the reference.

<Second Embodiment>

An image processing unit 33 according to a second embodiment performs processing for enlarging and reducing a subject image based on a disparity map in image processing in step S4 illustrated in FIG. 5. Steps S1 to S3 and steps S5 to S6 illustrated in FIG. 5 are the same as those in the first embodiment. Only items, which differ from those in the first embodiment, will be described below.

Figure 7:
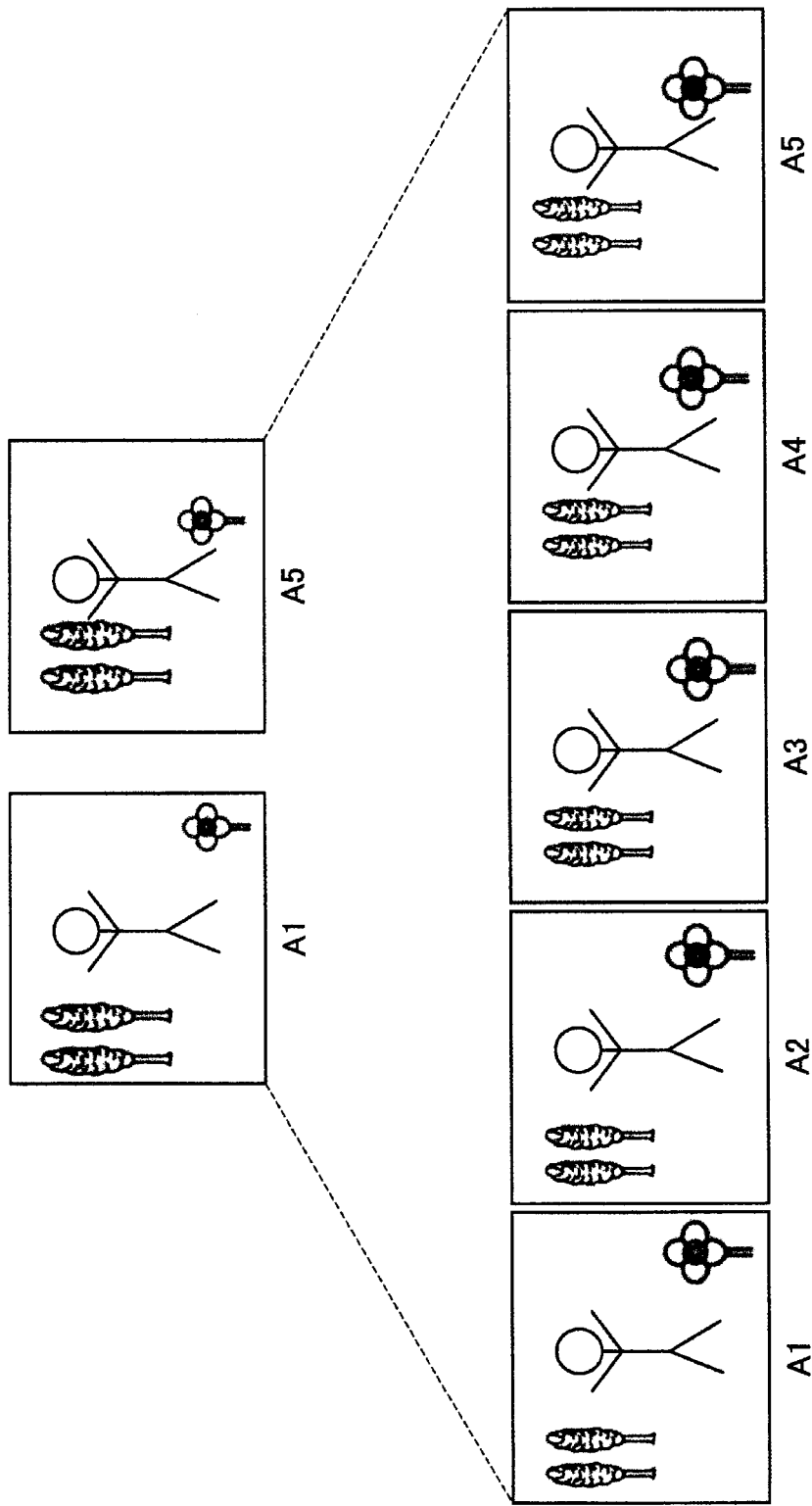
FIG. 7 is an illustration used for describing image processing in a second embodiment.

As illustrated in FIG. 7, if intermediate viewpoint images A2 to A4 are added to two viewpoint images A1 and A2, to generate multiple viewpoint images A1 to A5, the image processing unit 33 refers to a disparity map generated from the two viewpoint images A1 and A5, uses pixels between which there is no disparity (pixels composing a person in this example) as a reference, to determine whether another subject image (e.g., a flower or a tree) within each of the multiple viewpoint images A1 to A5 is in a back-side area behind the reference or a front-side area ahead of the reference, and performs image processing (enlargement/reduction processing) for reducing the subject image in the back-side area (the tree in this example) and enlarge the subject image in the front-side area (the flower in this example).

According to the present embodiment, a subject image in an area, which seems projected when a 3D photographic print is seen, is enlarged, and a subject image in an area, which seems retracted, is reduced. Therefore, a seeing method in 2D moving image display approaches a seeing method in the 3D photographic print.

<Third Embodiment>

A 2D moving image file generation unit 34 according to a third embodiment switches a display time based on a viewpoint position in 2D moving image file generation processing in step S5 illustrated in FIG. 5. Steps S1 to S4 and step S6 illustrated in FIG. 5 are the same as those in the first embodiment. Only items, which differ from those in the first embodiment, will be described below.

As illustrated in FIG. 8, if a multi-viewpoint image A1 to A5 is obtained, the 2D moving image file generation unit 34 according to the present embodiment sets display times of the viewpoint images A1 and A5 in viewpoint positions at both ends out of viewpoint images included in the multi-viewpoint image A1 to A5 shorter than a display time of the viewpoint image A3 at a viewpoint position at the center. More specifically, the farther the viewpoint image is spaced apart from the viewpoint at the center, the shorter the display time thereof is made. In this example, the display time of the viewpoint image A3 at the center is 0.3 seconds, the display times of the viewpoint images A2 and A4 outside both ends of the viewpoint image A3 are 0.2 seconds, and the display times of the viewpoint images A1 and A5 at both ends are 0.1 seconds.

While a case where the multi-viewpoint image 54 includes an odd number of viewpoint images has been described as an example to facilitate understanding of the invention, the same is true for a case where the multi-viewpoint image 54 includes an even number of viewpoint images. More specifically, the display times of the viewpoint images at the viewpoint positions at both ends are made shorter than the display time of the viewpoint image at the viewpoint position at the center.

According to the present embodiment, when a 3D photographic print is generated, the display times at the viewpoint positions at both ends where the refraction of a lenticular lens is increased is set shorter than the display time at the viewpoint position at the center. Therefore, a seeing method in 2D moving image display approaches a seeing method in the 3D photographic print.

While the present invention has been divided into a plurality of embodiments when described, the embodiments may be implemented in any combination. For example, the second embodiment and the third embodiment may be implemented in combination.

While a case where the plurality of viewpoint images included in the multi-viewpoint image are switched in the order of their viewpoints and sequentially output to the display unit 25 has been described as an example, an output unit is not particularly limited to the display unit 25. Another output device may be used. For example, a communication device may output the viewpoint images to a network, or may output the viewpoint images to a printing device.

The present invention is not limited to an example described in the specification and an example illustrated in figures. Various design changes and modifications may be made without departing from the scope of the invention.

Reference Signs List

2 . . . image processing device, 22 . . . image acquisition unit, 25 . . . display unit, 31 . . . disparity map generation unit, 32 . . . multiple viewpoint image generation unit, 33 . . . image processing unit, 34 . . . 2D image file generation unit, 35 . . . display control unit

The invention claimed is:

1. An image processing apparatus comprising:
   an image acquisition unit that acquires a plurality of viewpoint images generated by imaging a subject at a plurality of viewpoints;
   a disparity map generation unit that generates a disparity map representing a disparity distribution based on the plurality of viewpoint images;
   a multi-viewpoint image generation unit that generates a multi-viewpoint image including a plurality of viewpoint images the number of which is larger than the number of the plurality of viewpoint images based on the plurality of viewpoint images and the disparity map;
   an image processing unit that performs image processing for a subject image of the multi-viewpoint image based on the multi-viewpoint image and the disparity map and switches an amount of image processing for the subject image depending on the disparity; and
   an output unit that switches the plurality of viewpoint images included in the multi-viewpoint image, which has been subjected to image processing by the image processing unit, and sequentially outputs the viewpoint images;
   wherein the image processing unit makes an amount of blur of pixels, between which there is a larger disparity, in the multi-viewpoint image larger;
   wherein the image processing unit makes amounts of blur of the viewpoint images at viewpoint positions at both ends out of the plurality of viewpoint images included in the multi-viewpoint image larger than an amount of blur of a viewpoint image at a viewpoint position at the center.

2. The image processing apparatus according to claim 1, further comprising a display control unit that switches the plurality of viewpoint images included in the multi-viewpoint image, which has been subjected to image processing by the image processing unit, in the order of their viewpoints and displays the viewpoint images in two dimensions on a display device serving as the output unit.

3. The image processing apparatus according to claim 2, further comprising a moving image file generation unit that generates a moving image file for switching the plurality of viewpoint images included in the multi-viewpoint image, which has been subjected to image processing by the image processing unit, in the order of their viewpoints and displaying the viewpoint images in two dimensions on the display device serving as the output unit.

4. The image processing apparatus according to claim 1 further comprising a moving image file generation unit that generates a moving image file for switching the plurality of viewpoint images included in the multi-viewpoint image, which has been subjected to image processing by the image processing unit, in the order of their viewpoints and displaying the viewpoint images in two dimensions on the display device serving as the output unit.

5. The image processing apparatus according to claim 1, wherein the image processing unit refers to the disparity map, uses pixels between which there is no disparity as a reference, to determine whether a subject image within each of the viewpoint images is a back-side area or a front-side area, and performs image processing for reducing the subject image in the back-side area and enlarging the subject image in the front-side area.

6. An image processing apparatus comprising:
   an image acquisition unit that acquires a plurality of viewpoint images generated by imaging a subject at a plurality of viewpoints;
   a disparity map generation unit that generates a disparity map representing a disparity distribution based on the plurality of viewpoint images;
   a multi-viewpoint image generation unit that generates a multi-viewpoint image including a plurality of viewpoint images the number of which is larger than the number of the plurality of viewpoint images based on the plurality of viewpoint images and the disparity map;
   an image processing unit that performs image processing for a subject image of the multi-viewpoint image based on the multi-viewpoint image and the disparity map and switches an amount of image processing for the subject image depending on the disparity; and
   an output unit that switches the plurality of viewpoint images included in the multi-viewpoint image, which has been subjected to image processing by the image processing unit, and sequentially outputs the viewpoint images;
   wherein the image processing unit makes an amount of decrease in at least one of saturation, contrast, and sharpness of pixels, between which there is a larger disparity, in the multi-viewpoint image larger;
   wherein the image processing unit makes the amounts of decrease of the viewpoint images at the viewpoint positions at both ends out of the plurality of viewpoint images included in the multi-viewpoint image larger than the amount of decrease of the viewpoint image at the viewpoint position at the center.

7. The image processing apparatus according to claim 6, further comprising a display control unit that switches the plurality of viewpoint images included in the multi-viewpoint image, which has been subjected to image processing by the image processing unit, in the order of their viewpoints and displays the viewpoint images in two dimensions on a display device serving as the output unit.

8. The image processing apparatus according to claim 7, further comprising a moving image file generation unit that generates a moving image file for switching the plurality of viewpoint images included in the multi-viewpoint image, which has been subjected to image processing by the image processing unit, in the order of their viewpoints and displaying the viewpoint images in two dimensions on the display device serving as the output unit.

9. The image processing apparatus according to claim 6, further comprising a moving image file generation unit that generates a moving image file for switching the plurality of viewpoint images included in the multi-viewpoint image, which has been subjected to image processing by the image processing unit, in the order of their viewpoints and displaying the viewpoint images in two dimensions on the display device serving as the output unit.

10. An image processing apparatus comprising:
    an image acquisition unit that acquires a plurality of viewpoint images generated by imaging a subject at a plurality of viewpoints;
    a disparity map generation unit that generates a disparity map representing a disparity distribution based on the plurality of viewpoint images;
    a multi-viewpoint image generation unit that generates a multi-viewpoint image including a plurality of viewpoint images the number of which is larger than the number of the plurality of viewpoint images based on the plurality of viewpoint images and the disparity map;
    an image processing unit that performs image processing for a subject image of the multi-viewpoint image based on the multi-viewpoint image and the disparity map and switches an amount of image processing for the subject image depending on the disparity; and
    an output unit that switches the plurality of viewpoint images included in the multi-viewpoint image, which has been subjected to image processing by the image processing unit, and sequentially outputs the viewpoint images;
    wherein the output unit makes output times of the viewpoint images at the viewpoint positions at both ends out of the plurality of viewpoint images included in the multi-viewpoint image shorter than an output time of the viewpoint image at the viewpoint position at the center.

11. The image processing apparatus according to claim 10, further comprising a display control unit that switches the plurality of viewpoint images included in the multi-viewpoint image, which has been subjected to image processing by the image processing unit, in the order of their viewpoints and displays the viewpoint images in two dimensions on a display device serving as the output unit.

12. The image processing apparatus according to claim 11, further comprising a moving image file generation unit that generates a moving image file for switching the plurality of viewpoint images included in the multi-viewpoint image, which has been subjected to image processing by the image processing unit, in the order of their viewpoints and displaying the viewpoint images in two dimensions on the display device serving as the output unit.

13. The image processing apparatus according to claim 10, further comprising a moving image file generation unit that generates a moving image file for switching the plurality of viewpoint images included in the multi-viewpoint image, which has been subjected to image processing by the image processing unit, in the order of their viewpoints and displaying the viewpoint images in two dimensions on the display device serving as the output unit.

14. An image processing method comprising:
    an image acquisition step for acquiring a plurality of viewpoint images generated by imaging a subject at a plurality of viewpoints;
    a disparity map generation step for generating a disparity map representing a disparity distribution based on the plurality of viewpoint images;
    a multi-viewpoint image generation step for generating a multi-viewpoint image including a plurality of viewpoint images the number of which is larger than the number of the plurality of viewpoint images based on the plurality of viewpoint images and the disparity map;
    an image processing step for performing image processing for a subject image of the multi-viewpoint image based on the multi-viewpoint image and the disparity map and switching an amount of image processing for the subject image depending on the disparity; and an output step for switching the plurality of viewpoint images included in the multi-viewpoint image, which has been subjected to image processing in the image processing step, in the order of their viewpoints and sequentially outputting the viewpoint images;

wherein the image processing unit makes an amount of blur of pixels, between which there is a larger disparity, in the multi-viewpoint image larger;

wherein the image processing unit makes amounts of blur of the viewpoint images at viewpoint positions at both ends out of the plurality of viewpoint images included in the multi-viewpoint image larger than an amount of blur of a viewpoint image at a viewpoint position at the center.

15. An image processing method comprising:

an image acquisition step for acquiring a plurality of viewpoint images generated by imaging a subject at a plurality of viewpoints;

a disparity map generation step for generating a disparity map representing a disparity distribution based on the plurality of viewpoint images;

a multi-viewpoint image generation step for generating a multi-viewpoint image including a plurality of viewpoint images the number of which is larger than the number of the plurality of viewpoint images based on the plurality of viewpoint images and the disparity map;

an image processing step for performing image processing for a subject image of the multi-viewpoint image based on the multi-viewpoint image and the disparity map and switching an amount of image processing for the subject image depending on the disparity; and an output step for switching the plurality of viewpoint images included in the multi-viewpoint image, which has been subjected to image processing in the image processing step, in the order of their viewpoints and sequentially outputting the viewpoint images;

wherein the image processing unit makes an amount of decrease in at least one of saturation, contrast, and sharpness of pixels, between which there is a larger disparity, in the multi-viewpoint image larger;

wherein the image processing unit makes the amounts of decrease of the viewpoint images at the viewpoint positions at both ends out of the plurality of viewpoint images included in the multi-viewpoint image larger than the amount of decrease of the viewpoint image at the viewpoint position at the center.

16. An image processing method comprising:

an image acquisition step for acquiring a plurality of viewpoint images generated by imaging a subject at a plurality of viewpoints;

a disparity map generation step for generating a disparity map representing a disparity distribution based on the plurality of viewpoint images;

a multi-viewpoint image generation step for generating a multi-viewpoint image including a plurality of viewpoint images the number of which is larger than the number of the plurality of viewpoint images based on the plurality of viewpoint images and the disparity map;

an image processing step for performing image processing for a subject image of the multi-viewpoint image based on the multi-viewpoint image and the disparity map and switching an amount of image processing for the subject image depending on the disparity; and an output step for switching the plurality of viewpoint images included in the multi-viewpoint image, which has been subjected to image processing in the image processing step, in the order of their viewpoints and sequentially outputting the viewpoint images; wherein the output unit makes output times of the viewpoint images at the viewpoint positions at both ends out of the plurality of viewpoint images included in the multi-viewpoint image shorter than an output time of the viewpoint image at the viewpoint position at the center.

* * * * *